(12) United States Patent
Spragg et al.

(10) Patent No.: US 6,321,808 B1
(45) Date of Patent: Nov. 27, 2001

(54) EXPANDABLE BAND FOR RUN FLAT TIRE AND METHOD OF MAKING

(75) Inventors: Charles D. Spragg, Hudson; James M. Kirby, Akron, both of OH (US); Edward G. Markow, Jensen Beach, FL (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/537,657

(22) Filed: Mar. 29, 2000

(51) Int. Cl.⁷ .............................. B60C 9/18; B60C 17/00
(52) U.S. Cl. ................... 152/516; 152/526; 152/527; 152/538
(58) Field of Search .................. 152/516, 520, 152/533, 526, 538, 530, 527; 156/117, 177, 85

(56) References Cited

U.S. PATENT DOCUMENTS

| | | |
|---|---|---|
| 1,411,516 | 4/1922 | Reider . |
| 2,017,071 | 10/1935 | Minor ........................ 18/59 |
| 3,751,316 | 8/1973 | Menough et al. . |
| 3,842,885 | 10/1974 | Alban ............... 152/361 R |
| 3,850,219 | 11/1974 | Snyder .......... 153/361 DM |
| 3,933,566 | 1/1976 | Seiberling ............. 156/272 |
| 4,094,354 | 6/1978 | Ferrell et al. ........ 152/361 R |
| 4,111,249 | 9/1978 | Markow ......... 152/330 RF |
| 4,287,924 | 9/1981 | Deck et al. .......... 152/153 |
| 4,318,434 | 3/1982 | Markow ............. 152/156 |
| 4,428,411 | 1/1984 | Markow et al. ...... 152/330 RF |
| 4,456,048 | 6/1984 | Markow et al. ...... 152/330 RF |
| 4,459,167 | 7/1984 | Markow et al. ...... 156/110.1 |
| 4,673,014 | 6/1987 | Markow ............. 152/156 |
| 4,734,144 | 3/1988 | Markow ............. 156/123 |
| 4,794,966 | 1/1989 | Markow ............. 152/516 |
| 4,989,658 | 2/1991 | Maathuis et al. ..... 152/533 |
| 5,086,677 | 2/1992 | Languillat . |
| 5,368,082 | 11/1994 | Oare et al. .......... 152/517 |
| 5,427,166 | 6/1995 | Willard, Jr. .......... 152/454 |
| 5,795,417 | 8/1998 | Damke et al. ........ 152/527 |
| 5,879,484 | 3/1999 | Spragg et al. ........ 152/516 |

FOREIGN PATENT DOCUMENTS

| | | |
|---|---|---|
| 335 863 B | 4/1977 | (AT) . |
| 0 191 124 | 8/1986 | (EP) . |
| 0 400 859 | 5/1990 | (EP) . |
| 0 537 780 | 4/1993 | (EP) . |
| 0 853 009 A2 | 11/1997 | (EP) . |
| 63141809 | 12/1986 | (JP) . |

OTHER PUBLICATIONS

Derwent Abstract of EPO Publication 0 191 124.
**Derwent Abstract provides English language explanation per 37CFR 1.98(a)(3).

Primary Examiner—Michael W. Ball
Assistant Examiner—Justin Fischer
(74) Attorney, Agent, or Firm—Thomas R. Kingsbury; Michael Sand; John H. Hornickel

(57) ABSTRACT

A run flat pneumatic tire includes a thin annular monolithic band embedded in the crown portion of the tire wherein the band has a helical cut extending between opposite band edges. The cut has an arcuate length between 45° and 360° and provides a circumferentially expandable band which enhances molding of the tire by enabling the band to expand during molding to minimize porosity and reduce entrapment of air between the band and tread rubber. Alternately, a pair of helically cut bands are joined by an intervening band of rubber and a reinforcing layer of reinforcing cords in a rubber skim may extend about the outer surface of the expandable band or bands.

14 Claims, 7 Drawing Sheets

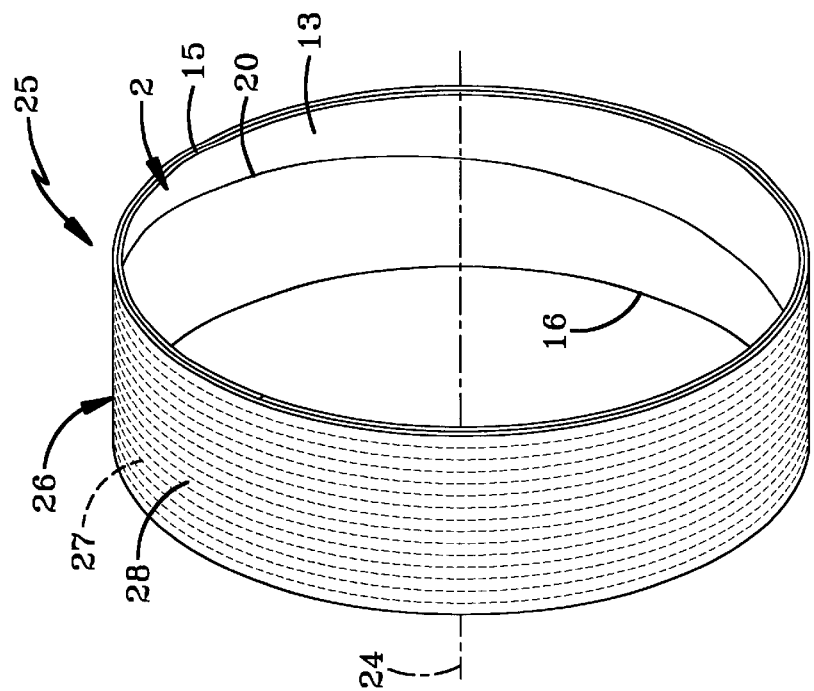
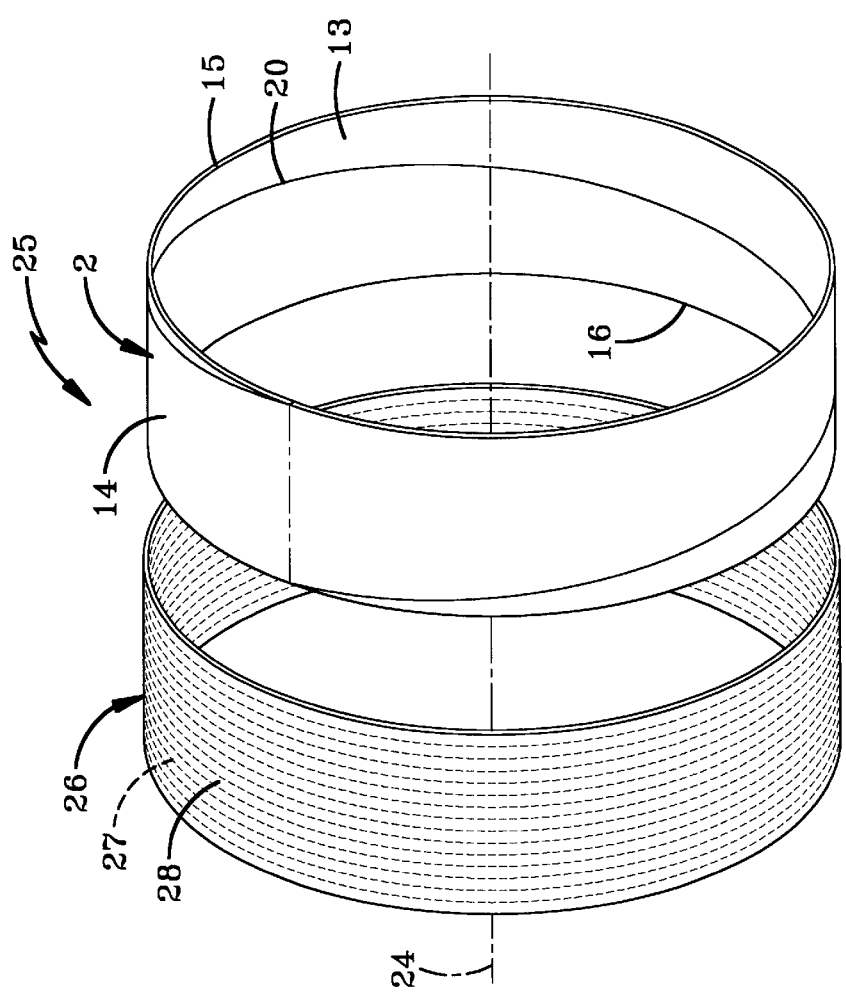

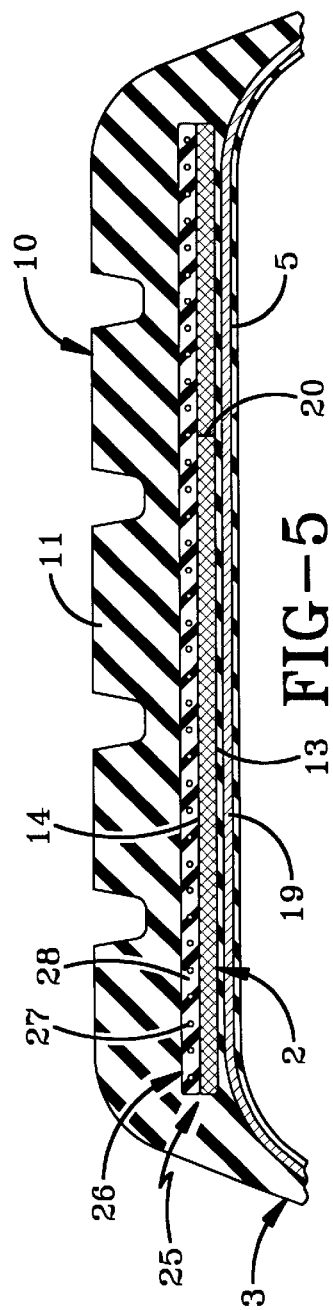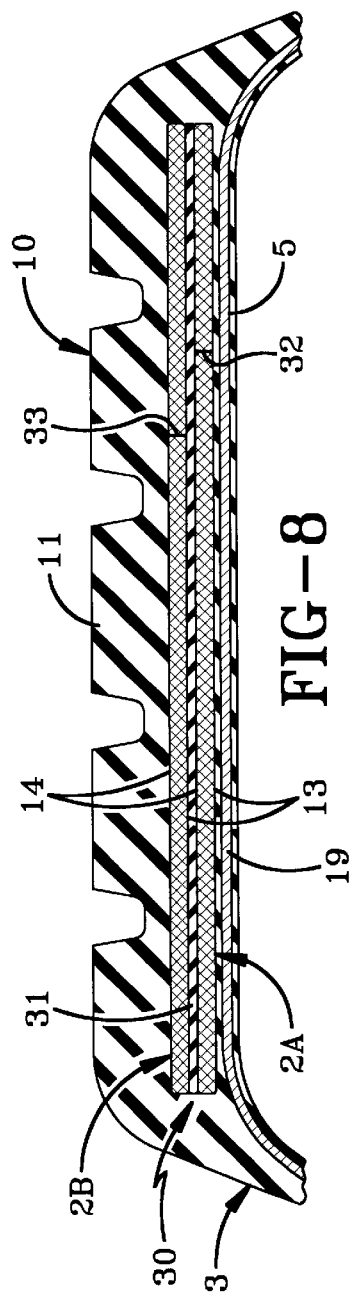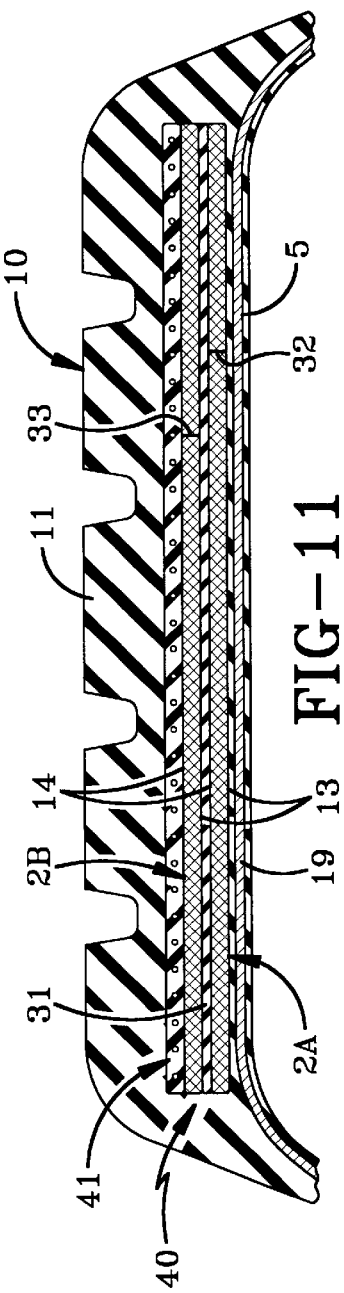

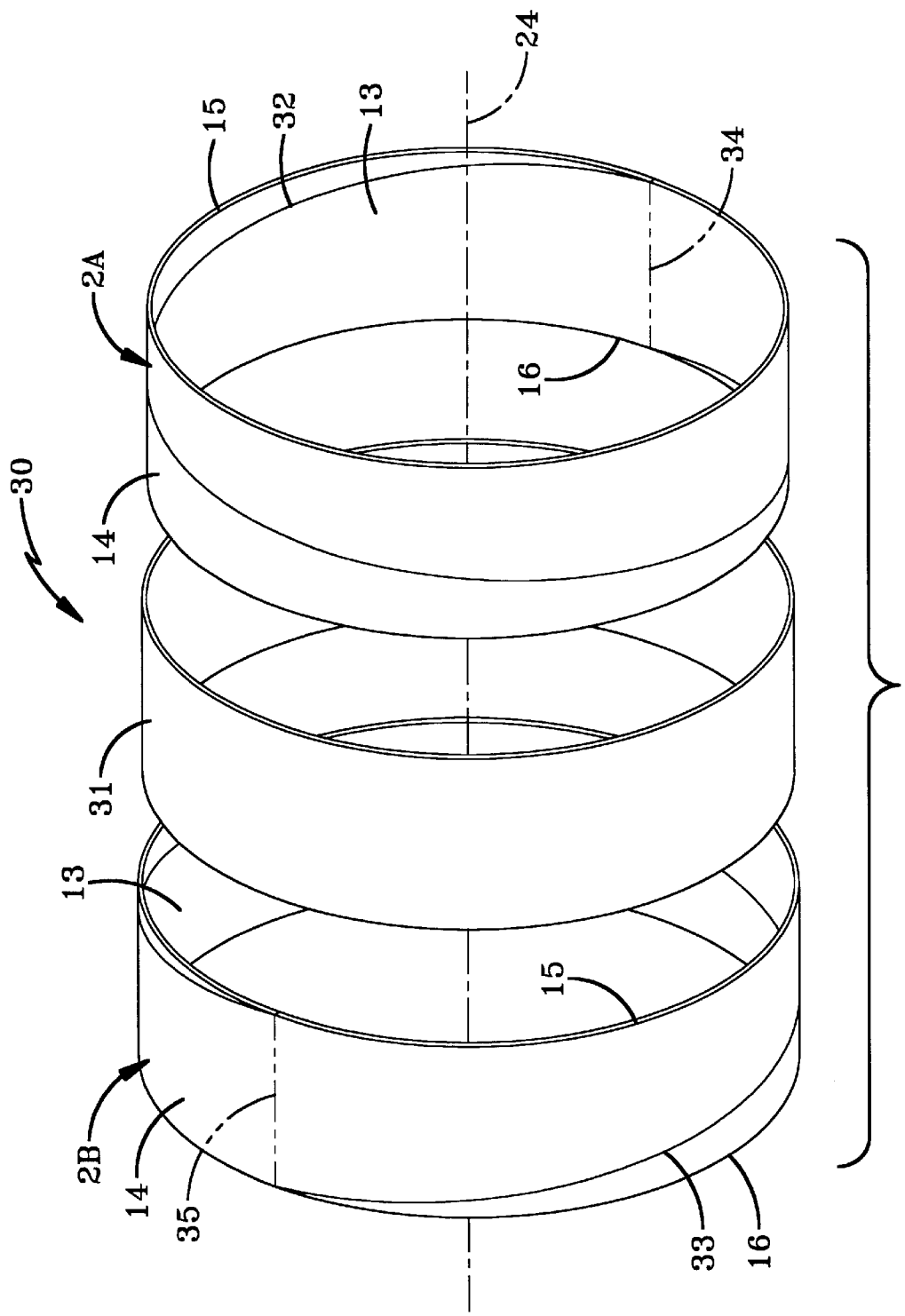

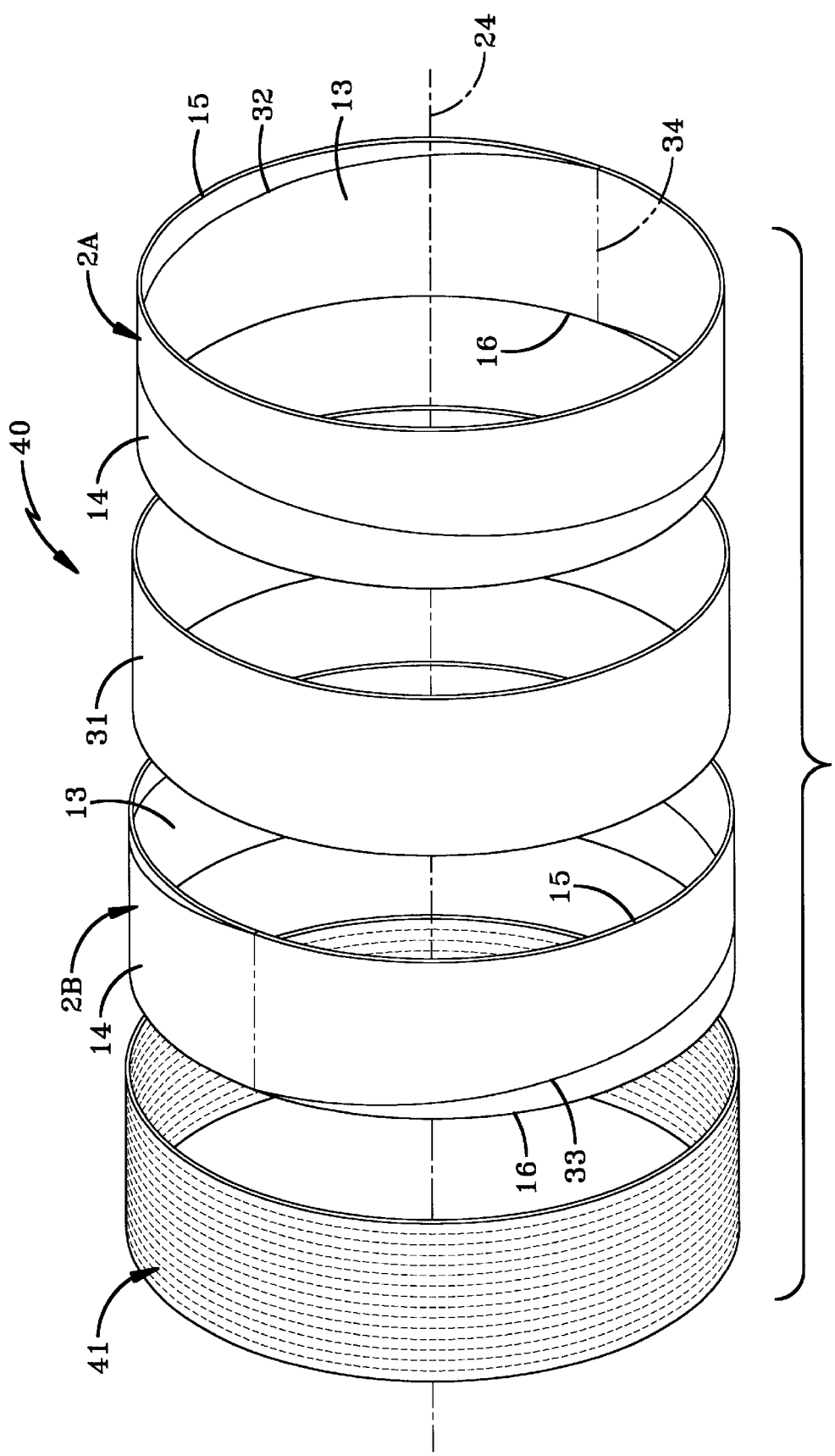

EXPANDABLE BAND FOR RUN FLAT TIRE AND METHOD OF MAKING

BACKGROUND OF THE INVENTION

1. Technical Field

The invention relates to pneumatic tires and more particularly to a run flat pneumatic vehicle tire containing a thin annular band which acts as a structural compression member when the tire is in the unpressurized or uninflated state which allows loads to act over a substantial portion of the circumference of the tire to enable the tire to run in the unpressurized condition. More particularly, the invention relates to such a band element which is circumferentially expandable to enhance the process of manufacturing the run flat tire without materially sacrificing the run flat capability achieved by the tire.

2. Background Information

Various tire constructions have been developed over the years which enable a tire to run in an uninflated condition, such as after receiving a puncture and loss of pressurized air, for extended periods of time and at relatively high speeds. This enables the vehicle operator to safely drive the vehicle to an appropriate location for repair or replacement of the uninflated tire. These tires are referred to as "run flat tires" and have been successful for certain applications and in certain types of tire constructions. One such type of run flat tire incorporates a thin annular high strength monolithic band which acts as a tension member when the tire is pressurized and acts as a structural compression member when the tire is in the unpressurized state, and are referred to as "banded run flat tires". Some examples of such banded run flat tires are shown in U.S. Pat. Nos. 4,428,411; 4,673,014; 4,794,966; 4,456,084; 4,111,249; 4,318,434; 4,459,167; 4,734,144 and 5,879,484.

Nearly all of the band elements used in these prior art run flat tires are in-extensible in the circumferential direction when placed in the green tire prior to curing. The inability of the band to sufficiently expand during curing can cause problems of tread rubber porosity and air entrapment between the outside surface of the band and the adjacent surface of the tread rubber. To eliminate such air entrapment it requires extremely accurate control of the amount of tread rubber placed in the mold, which with many existing molds and control equipment is difficult to achieve to prevent or reduce such air entrapment. Thus, existing run flat pneumatic tires using the known nonextensible rigid bands are difficult to economically manufacture in order to eliminate the tread rubber porosity and air entrapment between the tread rubber and outer surface of the run flat band. Likewise, this inextensibility of the band may inhibit the intimate contact necessary between the band element and surrounding rubber to form the desired adhesive bond therebetween when using conventional curing systems and equipment.

U.S. Pat. Nos. 4,428,411; 4,673,014 and 4,794,966 disclose run flat tires which have an annular structural compression element in the inside surface of the crown portion of the tire wherein the compression element is a helix formed by closely spaced coils wound from a rod of various solid and tubular cross sections. The coils are in a stressed condition and are applied following the second stage expansion of the green tire and are difficult to form as a separate element and then inserted into the inner crown portion of the tire prior to molding. Likewise, the band elements of these three prior art patents are difficult to economically produce and be used in a conventional tire building process as is the expandable band of the present invention which requires only minor changes to the existing tire manufacturing process.

In summary, the present invention provides a band element for a run flat tire which is expandable during curing to reduce the problems of tread rubber porosity and air entrapment between the band and adjacent tread rubber to provide more intimate contact therebetween to form a better adhesion bond than possible and at reduced costs than achieved with the heretofore inexpandable band elements.

SUMMARY OF THE INVENTION

The present invention provides a band element for a run flat tire formed of a prior rigid monolithic band structure in which a small helical cut is made from one edge in a circumferential helical manner to the other edge of the band to provide a circumferentially expandable band which does not materially affect its run flat support capability, yet enhances the manufacture of the tire and eliminates or materially reduces the porosity and entrapment of air between the band and tread rubber and providing better adhesion between the band and surrounding rubber.

The helical cut in the band of the present invention preferably extends 360 arcuate degrees or one complete revolution of the band, whereby the starting and ending locations of the cut at the band edges are spaced axially apart.

Another aspect of the invention enables the band to be produced initially as an inexpandable band element by usual manufacturing operations and then provided with the desired helical cut at sites completely separate from the manufacture of the final tire, and then subsequently incorporated with the green tire in the final building stage of the tire manufacture.

Another aspect of the invention provides incorporating an outer reinforcing layer around the helically cut band formed of a plurality of reinforcement cords in a rubber skim to stabilize the band element in the circumferential and axial directions upon curing so that no separation of the band occurs along the helical cut.

Still another aspect of the invention provides arranging the reinforcing cords in the outer reinforcing layer either in a parallel circumferentially extending direction or as pairs of overlapping cords biased at opposite angles with respect to each other and to the band axis.

Another feature of the invention is to provide a second expandable band similar to the first band, which is mounted concentrically to the first band and secured thereto by a thin intervening layer of rubber, wherein its axial cut preferably is equal in arcuate length to that of the other band but is a mirror image thereto.

Another aspect of the invention is to provide an outer reinforcing layer formed of circumferential or bias cords over the double band and rubber composite band to increase its stability during curing.

Another feature of the invention is forming the edges of the helical cut on a bevel whereby the cut edges overlap each other, preferably at a distance approximately equal to the thickness of the band.

Another aspect of the invention is forming the helical cut having an arcuate length of between 270° and 450°, with the preferred length of cut being one complete revolution or 360°.

Still another aspect of the invention is forming the reinforcing cords of the outer reinforcement layer of a material selected from the group consisting of nylon, polyester, steel and aramid and forming the band from a material selected from the group consisting of steel, aluminum, thermoplastic and thermosetting materials, and composites thereof.

Thus, the invention provides a band element which can be manufactured in an efficient and effective manner for subsequent incorporation into a run flat tire wherein the band is expandable circumferentially in the tire curing mold to form a better adhesion bond with the adjacent rubber without affecting the curing operation and equipment heretofore used, and which is achieved by modifying a heretofore used and constructed inextensible monolithic run flat band element.

The foregoing advantages, construction and operation of the present invention will become more readily apparent from the following description and accompanying drawings.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 3 is an exploded perspective view of a modified expandable band;

FIG. 4 is a perspective view of the modified band of FIG. 3 in an assembled condition;

FIG. 5 is an enlarged sectional view of the modified band of FIG. 4 mounted in the crown portion of a pneumatic tire;

FIG. 6 is an exploded perspective view of another embodiment of the expandable band;

FIG. 8 is an enlarged fragmentary sectional view of the crown portion of a pneumatic tire having the band of FIG. 7 incorporated therein;

FIG. 9 is an exploded perspective view of another embodiment of the expandable band;

FIG. 11 is an enlarged fragmentary sectional view of the crown portion of a pneumatic tire having the band of FIG. 10 incorporated therein.

Similar numerals refer to similar parts throughout the drawings.

DESCRIPTION OF THE PREFERRED EMBODIMENTS

Figure 1:
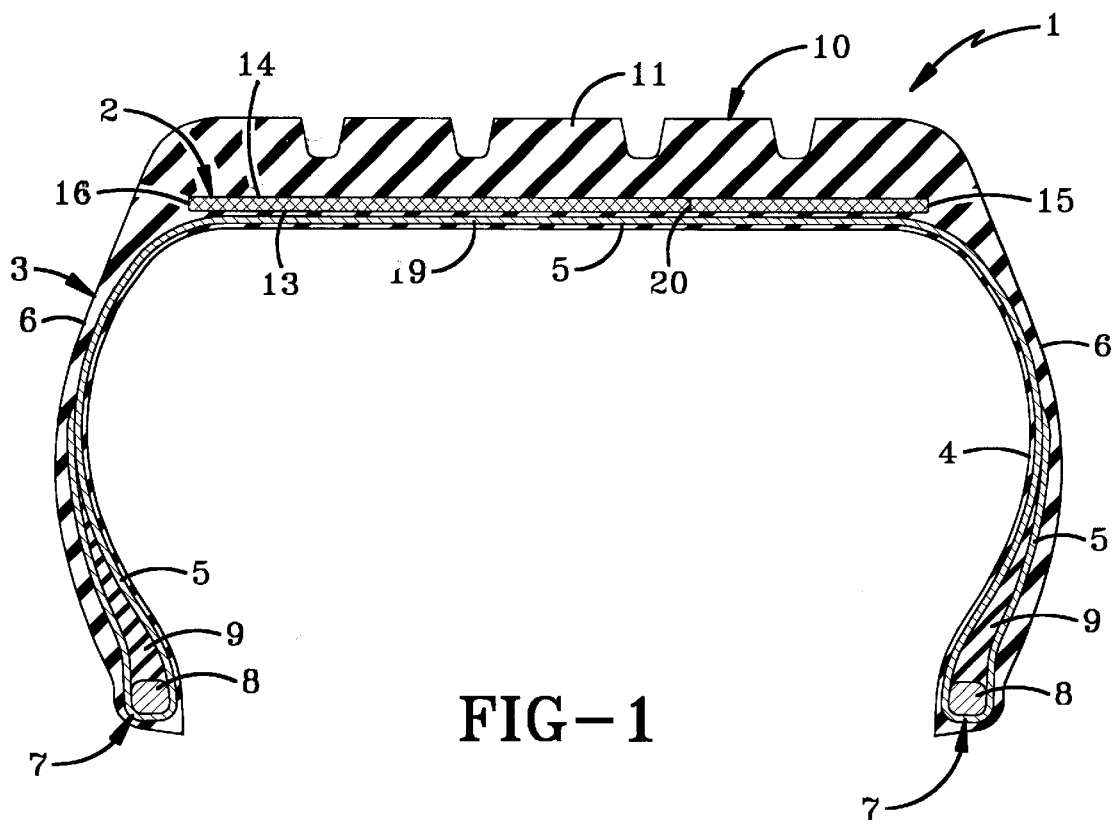
FIG. 1 is a sectional view of a pneumatic tire containing the expandable band of the present invention.

FIG. 1 is a sectional view of a pneumatic tire indicated generally at 1, having the improved expandable run flat band indicated generally at 2 incorporated therein. Tire 1 is of a usual construction and includes a body ply carcass 3 consisting of an innerliner 4, a plurality of body plies 5, sidewalls 6 extending from the crown portion of the tire to bead packages 7. Bead packages 7 will typically include a bead 8 and a bead filler 9 and may have gum abrasion strips and other components therein all of which are well known in the tire building art. Body ply carcass 3 is assembled and then molded with a typical tread package 10 which will usually contain a tread strip 11 and various reinforcing belts (not shown) contained therein. Band 2 is molded into the crown portion of the tire between tread package 10 and body ply carcass 3, which is accomplished in a usual tire mold.

Figure 1A:
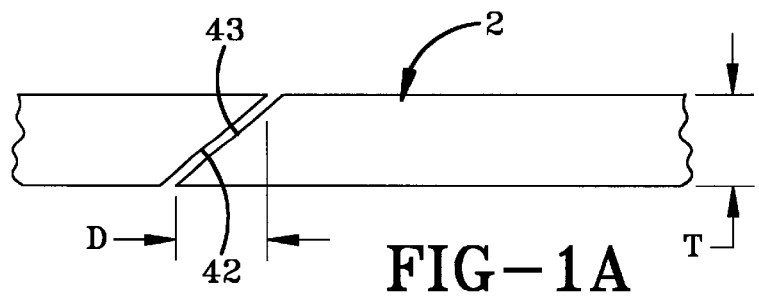
FIG. 1A is an enlarged fragmentary view of the band with a helical cut having a beveled edge configuration.

In accordance with the invention, expandable band 2 (FIG. 2) is of an annular uniform configuration having an inner surface 13, an outer surface 14 and end edges 15 and 16 with a uniform thickness "T" measured radially between inner and outer surfaces 13 and 14 as shown particularly in FIG. 1A. Band 2 preferably is initially a rigid monolithic structure formed of various materials such as aluminum, steel and of various types of thermoplastic and thermosetting materials which form a composite which preferably is reinforced with various materials such as graphite. A preferred example of this initial band is shown in U.S. Pat. No. 5,879,484 in which the various advantages and features of such a rigid monolithic run flat band are discussed in detail. The contents of this patent are incorporated herein by reference.

Figure 2:
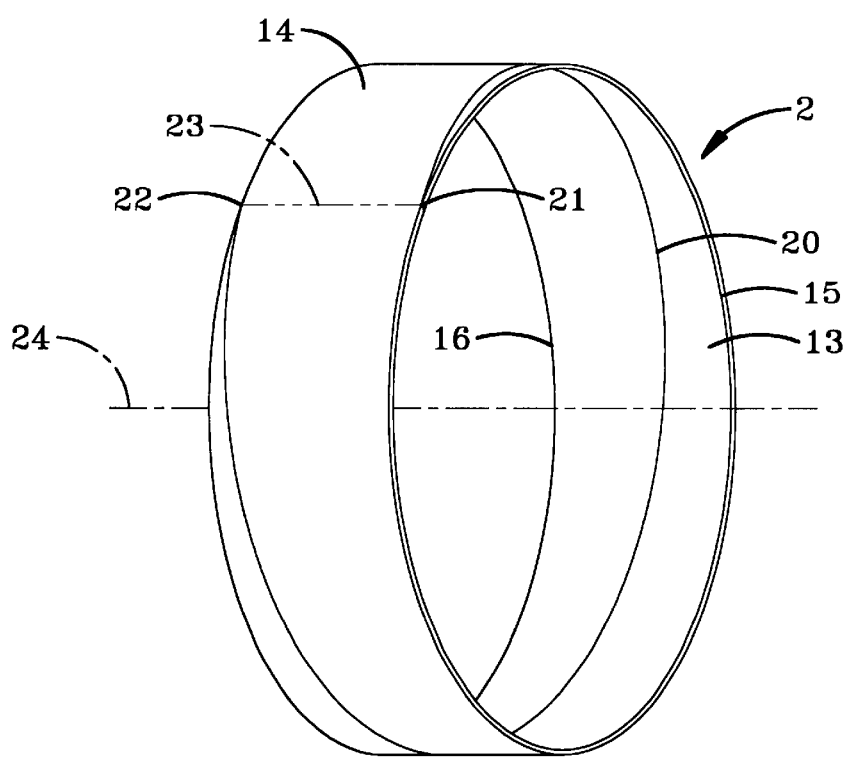
FIG. 2 is a perspective view of the expandable band removed from the tire of FIG. 1.

In accordance with one of the main features of the invention, a helical cut 20 is formed completely through band 2 between inner and outer surfaces 13 and 14, and extends circumferentially with a helical cut having a starting point 21 at edge 15 and terminating at an ending point 22 on the opposite end edge 16. In the preferred embodiment, cut 20 will have an arcuate circumferential length of 360°, that is, one complete revolution, so that the two end points 21 and 22 are axially opposite of each other as shown by dot-dash line 23 which is parallel with band axis 24. However, the arcuate length of cut 20 can vary between approximately 270° and 450° without affecting the concept of the invention since it still provides a band which is expandable in the circumferential direction without materially lessening the structural rigidity provided by the band which is necessary to achieve the run flat characteristics when incorporated within tire 1. Since the load carrying capacity of the banded tire relies primarily on the bending strength of the band element in the circumferential direction, the band would preferentially have circumferentially uniform bending strength. Accordingly, if the beginning and ending of the helical cut in the band is made so that the helical cut advances the axial length of the band per one complete revolution as shown in FIG. 2, the band element will have constant cross sectional area, constant moment of inertia and constant bending stiffness in the circumferential direction except for minor end effects associated with initiation and completion of the helical cut. However, the angle formed by the beginning and ending of the helical cut would vary depending upon the arcuate length of the cut.

A modified embodiment of the expandable band is indicated generally at 25, and is shown in FIGS. 3–5. In this arrangement, band 2 is augmented with an annular reinforcement layer 26 placed on outside surface 14 of the band. The purpose of reinforcement 26 is to stabilize the band element in the circumferential and axial directions upon curing so that no separation of the band element occurs along the helical cut. Reinforcement layer 26 on the outside diameter of band 2 combined with the usual reinforcing cords 19 in body ply 5 on the inside diameter of the band element as shown in FIGS. 1 and 5, complement one another so that upon curing the band element with the helical cut behaves structurally as if it were a monolithic band without a helical cut. The band then has nearly uniform bending stiffness in the circumferential direction in the final cured state. Reinforcement layer 26 preferably is a usual cap ply material in which a plurality of reinforcing cords 27 formed of nylon, polyester, steel, aramid or similar conventional reinforcing cord materials, are embedded in a rubber skim 28. In the embodiment shown in FIGS. 3–5, reinforcing cords 27 are in a parallel circumferentially extending direction wrapped at an angle approximately 90° relative to band axis 24.

Figure 4A:
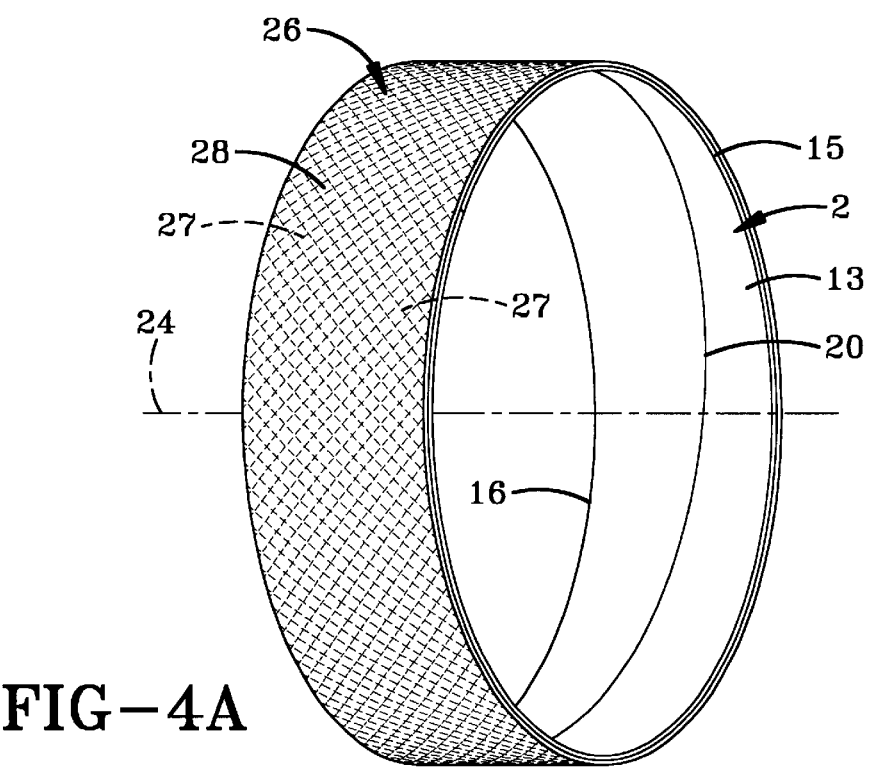
FIG. 4A is a perspective view similar to FIG. 4 showing a modified reinforcing layer thereon.

Alternatively, reinforcing cords 27 could be made as overlapping layers placed at symmetrical angles, i.e. ±45° relative to the band axis, as shown in FIG. 4A, and be made of material similar to those discussed above without effecting the concept of the invention.

Clearly the reinforcement placed on the outside diameter of the band 2 in conjunction with the body cords 19 on the inside diameter of the band provides integral curing between the band and the surrounding rubber so that structurally the helical cut in the band after curing, is tight and preserves flexural strength in the circumferential direction and is less likely to open up or separate in operation. Thus, reinforcement layer 26 enables the band to behave as a monolithic rigid band element to ensure that the band maintains its material stiffness (axial flexural strength and/or bending stiffness in the axial direction) uniformly symmetrically around the tire not withstanding the helical cut, with the reinforcement layer providing additional lateral stiffness.

Figure 7:
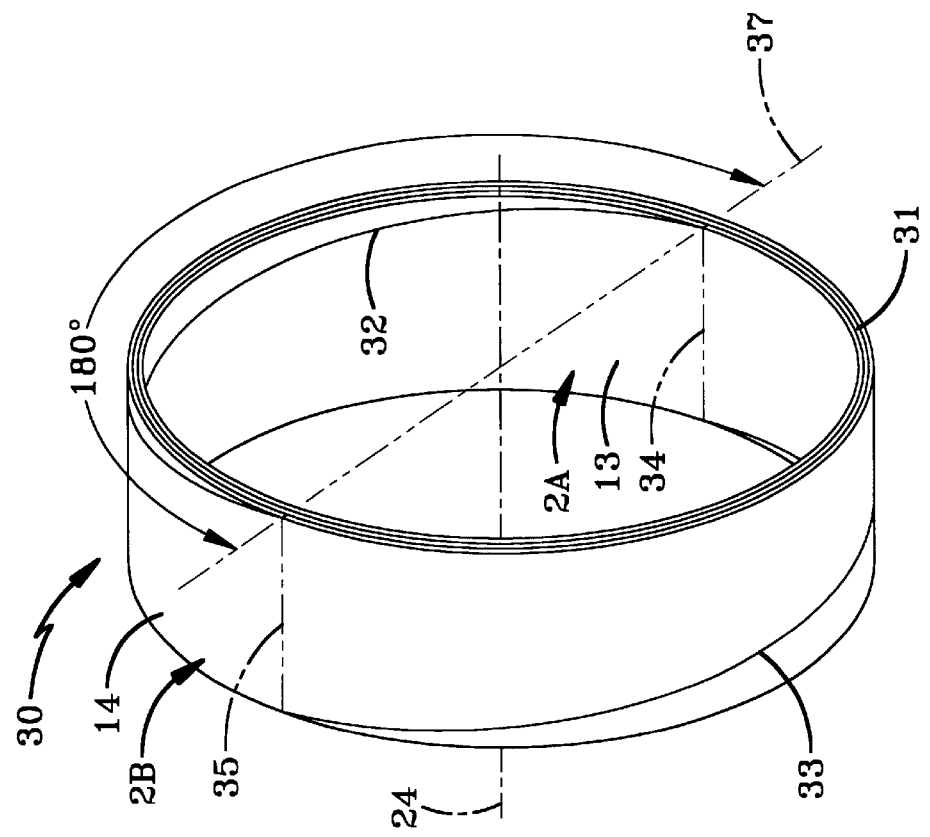
FIG. 7 is a perspective view of the modified band of FIG. 6 in an assembled condition.

Another embodiment of the band is shown in FIGS. 6–8 and is indicated generally at 30. In embodiment 30, two bands 2A and 2B having the same characteristics and helical cut as discussed above with respect to band 2, are mounted concentrically with respect to each other as shown. A thin intervening layer of rubber 31 provides a link between inner and outer bands 2A and 2B so that the composite band 30 behaves structurally as a one-piece monolithic band element as opposed to behaving as two individual bands. Inner or smaller diameter band 2A has a helical cut 32, preferably made from one axial end to the other in a previously formed inextensible band, which again ranges between 270° and 450° as discussed above and shown in FIG. 2. Again, the preferable cut advances the entire axial length of the band for 360° or one complete revolution with the cut end points lying along an axial line 34 parallel with band axis 24. The larger diameter band 2B has a helical cut 33 formed in a previously inextensible band preferably extending for the same circumferential length as that of band 2A but in an opposite direction relative to helical cut 32 made in inner band 2A, thus being a mirror image thereof. Again, the preferred length of helical cut 34 will extend for one complete revolution having an axially opposite starting and end points as discussed above with band 2 which lie along an imaginary axis indicated at 35. As shown in FIG. 7, the imaginary lines 34 and 35 of bands 2A and 2B respectively, when assembled with rubber layer 31, preferably are radially spaced apart 180° as shown by dot-dash line 37. Band 30 when cured within tire 1 is depicted in FIG. 8.

Rubber layer 31 preferably is formed of a high modulus, low hysteresis material and will bond with the adjacent rubber in the body plies and with a layer of rubber encasing band 30 if so encased during curing of the green tire.

Figure 10:
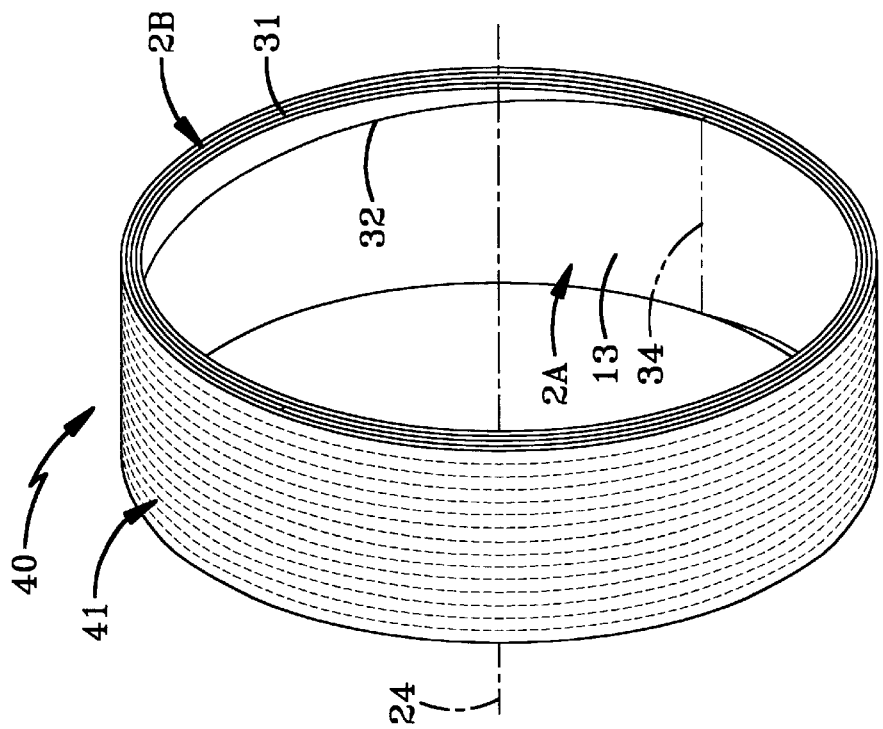
FIG. 10 is a perspective view of the modified band of FIG. 9 in an assembled condition.

A still further embodiment of the improved run flat band is indicated at 40, and is shown in FIGS. 9–11. Band 40 includes the composite band 30 discussed above, in combination with an outer reinforcement 41 which is the same or similar to reinforcement 26 discussed above and shown in FIGS. 3 and 4. Again, reinforcement layer 41 ensures that the band is stabilized in the circumferential direction upon curing so that no separation of the band occurs along the helical cut and that the reinforcement on the outside of larger diameter band 2A combined with the body cords 19 of body ply 5 on the inside diameter of smaller diameter band 2B complement one another, so that upon curing both bands with helical cuts behave structurally as if they were monolithic band elements without any cuts being formed therein. Thus, both bands have nearly uniform bending stiffness in the circumferential direction when in the final cured state.

Another advantage of the expandable band of the present invention is that it can be incorporated easily into a usual tire building manufacture without substantial modifications thereto. In the preferred method, band 2 is initially formed as a rigid monolithic thin rigid annular band such as discussed in U.S. Pat. No. 5,879,484, after which the helical cut is incorporated therein. Next, the cut band is assembled with body carcass 3 and tread package 10, or prior thereto have reinforcing layer 26 applied thereon. Likewise, a pair of the helical cut bands can be joined by rubber layer 31 to form a composite band element which is then placed in the uncured tire, or have outer reinforcement layer 41 applied thereto before forming with the uncured tire. Thus, the band, whether consisting of a single helical cut band or the various combinations thereof discussed above, can be formed at a manufacturing site separate from the uncured tire and transported and stored in a convenient manner prior to assembly with the uncured tire.

Figure 8A:
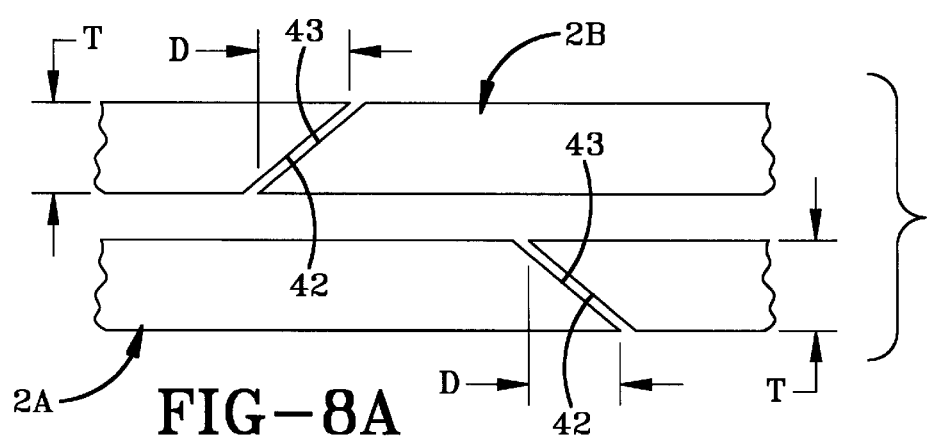
FIG. 8A is an enlarged fragmentary view of the band with a helical cut having a beveled edge configuration.

It has been found desirable for certain applications as shown in FIGS. 1A and 8A, that when forming the helical cuts, the cut be made at a relatively low angle relative to the band surface as opposed to being normal thereto, so that a pair of beveled cut edges 42 and 43 are formed in band 2 (FIG. 1A) as well as in the bands 2A and 2B as shown in FIG. 8A. The bevel cut which preferably is in the range of 30° to 60°, provides an overlap of the band segments at the helical cut to increase the ability of the band to accept sheer loads in a radial direction. Preferably the amount of overlap indicated at "D", is approximately equal to the band thickness "T".

In summary, the improved expandable band provides a pneumatic tire which is capable of running in an under inflated or uninflated condition, referred to throughout as a "run flat tire," wherein the expandable band is preferably formed by a helical cut in an initially formed monolithic circumferentially inextensible rigid band, enabling the band to expand radially outwardly during molding to form a solid bond with the adjacent rubber of the tread eliminating entrapment of air therein and the undesirable porosity in the tread, while preserving flexural stiffness in the circumferential direction required to provide the run flat characteristics to the molded tire. Furthermore, the incorporation of an outer reinforcing layer formed of a body ply type material maintains the integrity of the helical cut band prior to and during curing with the green tire.

While the embodiments of the invention have been described, the invention is not limited thereto.

What is claimed is:

1. A run flat pneumatic tire including an elastomeric casing with a tread formed in a crown portion thereof and sidewalls extending from the crown portion to generally circular beads; a first thin annular run flat band fixed in the crown portion of the tire radially inwardly of said tread having an axial width extending between a pair of end edges and having a radial thickness measured between inner and outer circumferential surfaces, said band being formed with at least one cut extending between the inner and outer surfaces through the band thickness and extending in a circumferential generally helical direction across the band width from edge-to-edge with the arcuate length of the cut relative to the band circumference being in the range of between 270° and 450° providing a circumferential expandable band.

2. A pneumatic tire defined in claim 1 wherein the arcuate length of the helical cut is approximately 360° starting and ending at opposite axial locations at the end edges.

3. A pneumatic tire defined in claim 1 wherein the helical cut is at an angle relative to the inner and outer band surfaces to form a pair of opposed beveled cut edges which overlap each other.

4. A pneumatic tire defined in claim 3 wherein the angle of cut is in the range of 30° and 60°.

5. A pneumatic tire defined in claim 3 wherein the band has a substantially uniform radial thickness "T"; and in which the length of overlap is approximately equal to said thickness "T".

6. A pneumatic tire defined in claim 1 wherein an annular reinforcement extends concentrically about the outer surface of the band.

7. A pneumatic tire defined in claim 6 wherein the annular reinforcement is a cap ply formed of reinforcing cords contained in an rubber skim.

8. A pneumatic tire defined in claim 7 wherein the reinforcing cords extend circumferentially at an angle approximately 90° relative to the axis of the band.

9. A pneumatic tire defined in claim 7 wherein the reinforcing cords are formed of a material selected from the group consisting of nylon, polyester, steel and aramid.

10. A pneumatic tire defined in claim 6 wherein the annular reinforcement is a cap ply containing two ply layers of overlapping reinforcing cords placed at similar but opposite angles to each other.

11. A pneumatic tire defined in claim 1 wherein a second thin annular band is located concentrically about the outer surface of said first band and is bonded thereto by a thin annular concentric band of intervening rubber; and in which said second band has an arcuate helical cut formed therein to provide circumferential expandability thereto.

12. A pneumatic tire defined in claim 11 wherein the cut in the second band is a mirror image of the cut in the first band.

13. A pneumatic tire defined in claim 11 wherein an annular reinforcement including a cap ply formed of reinforcing cords in a rubber skim extends circumferentially about the outer surface of the first band.

14. A pneumatic tire defined in claim 1 wherein the first band is a material selected from the group consisting of steel, aluminum, thermoplastic and thermosetting materials.

* * * * *